UNITED STATES PATENT OFFICE.

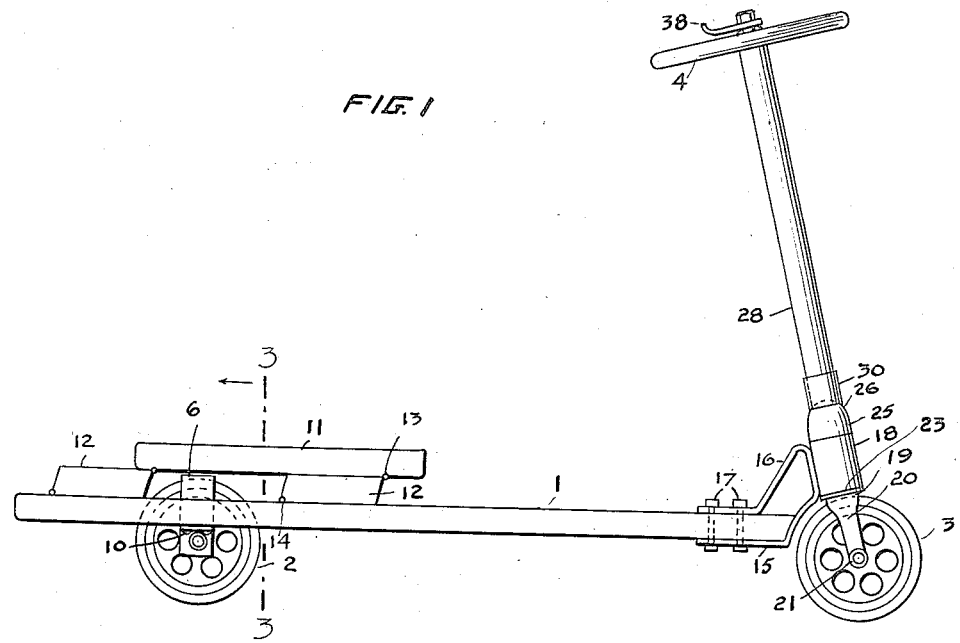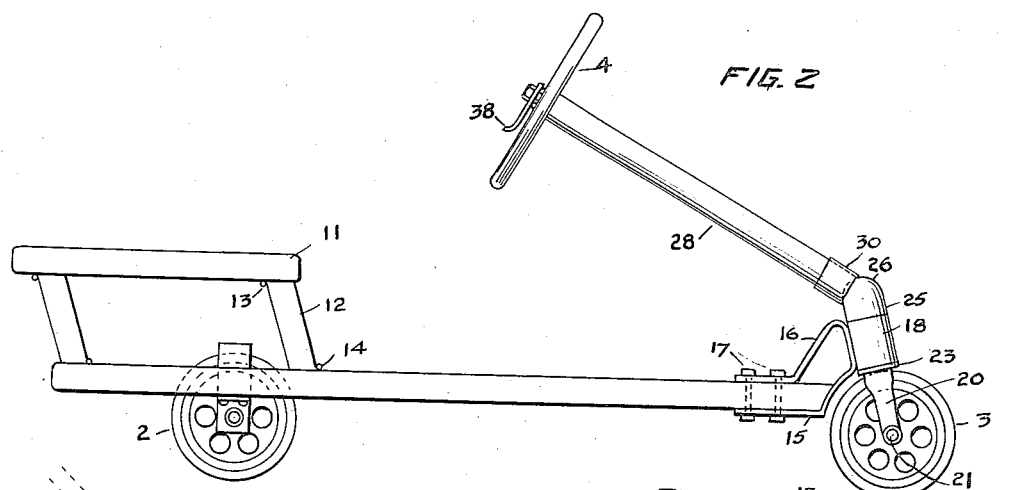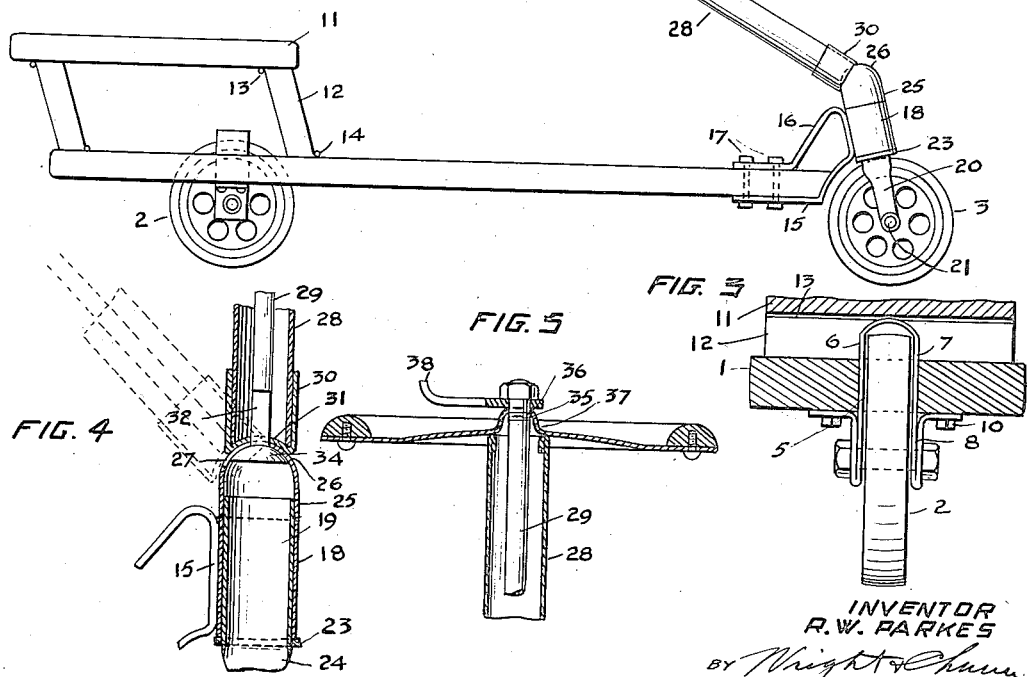

RICHARD W. PARKES, OF SAN FRANCISCO, CALIFORNIA.

COASTER.

1,416,864.	Specification of Letters Patent.	Patented May 23, 1922.

Application filed May 1, 1920. Serial No. 378,093.

*To all whom it may concern:*

Be it known that I, RICHARD W. PARKES, a citizen of the United States, residing at San Francisco, in the county of San Francisco and State of California, have invented new and useful Improvements in Coasters, of which the following is a specification.

This invention resides in the provision of a simply constructed, novel, and inexpensive coaster or scooter of the type propelled by placing one foot on the coaster and effecting a pushing action with the other foot, or which may be used to "coast" upon hills or other inclined surfaces.

An object of the invention is to provide a device of the character described which is constructed so that the operator may stand or sit comfortably upon the body of the device and readily steer and propel or "coast" the device in either position, there being provided a novel form of collapsible seat, and adjustable steering gear to permit of such use of the device.

The invention possesses other advantages and features, some of which, with the foregoing will be set forth at length in the following description wherein I shall outline in full that form of the invention which I have selected for illustration in the drawings accompanying and forming a part of the present specification. In said drawings I have shown one form of the construction of my invention, but it is to be understood that I do not limit myself to such form, since the invention as expressed in the claims may be embodied in a plurality of forms.

Figure 1 is a side elevation of the invention.

Figure 2 is a side elevation showing the seat in raised position and the steering gear tilted, so as to be operable from the seat.

Figure 3 is a transverse sectional view taken on the line 3—3 of Figure 1, showing the wheel in front elevation.

Figure 4 is an enlarged fragmentary vertical sectional view of the adjustable connection for the steering gear.

Figure 5 is an enlarged fragmentary vertical sectional view taken through the steering wheel, showing the manner of adjusting the connection.

Referring to the drawing, 1 designates a flat narrow board or plate constituting the body of the coaster, and having a single rear supporting wheel 2 and a front steering and supporting wheel 3. A steering gear including a steering wheel 4 is connected with the body and wheel 3.

The body 1 is longitudinally slotted near its rear end as at 5 and receives a metal wheel guard 6, which guard extends a slight distance above the body. The sides 7 of the guard extend below the body 1 and are doubled back on themselves as at 8, then bent outwardly to provide flanges secured by suitable fastenings 10 to the under side of the body. The wheel 2 is suitably journalled between the sides 7. By this arrangement, the rear wheel will be reliably supported in line with the longitudinal centre of the body and thus permit an easy balancing of the device when in operation.

Ordinarily the body 1 is stood upon by the operator who places one foot on the body and pushes or propels the coaster with the other foot while holding on to the steering wheel. To provide a comfortable seat which will not interfere with the above manner of use of the coaster, I employ a preferably flat seat 11 to the ends of which supporting blocks 12 are hinged, as at 13. These blocks at their lower ends are hinged as at 14, to the body 1 near the rear end of said body, the hinges at 14 being foremost and on the sides or edges the blocks opposite the hinges 13. This permits the blocks to swing forwardly and to lie flat upon the body 1 with the seat 11 resting on the blocks as shown in Figure 1. Obviously the seat may be extended from this position, as shown in Figure 2. The ends of the blocks are slightly inclined, but are flat so as to permit the seat to extend rearwards of the body when raised.

A metal strip 15 is suitably fastened to the under side of the body and extends forwardly and upwardly from the front end of the body and then downwardly, as at 16, and is secured as at 17 to the upper side of the body. This strap is welded or otherwise secured to a tubular sleeve 18. A tubular shaft 19 extends through and is rotatable in the sleeve 18. The lower end of this shaft is bifurcated to provide a fork 20 in which the front wheel 3 is mounted, as at 21. A washer 23 is interposed between an outward enlargement 24 of the shaft 19 and the lower end of the sleeve 18. By turning the shaft the wheel 3 is turned, so as to steer the coaster.

Mounted upon the upper end of the shaft is a tubular member 25 having a semi-spherical or convex upper end 26. This end has a slot 27 therein extending in the direction of the longitudinal axis of the body 1. A tubular steering column 28 is connected with the member 25 by a steering rod 29 operating in said column and upon which the steering wheel is secured. A tubular member 30 is mounted on the lower end of the column and has a concave lower end 31 which receives the convex end of the member 25, vertically making a bolt and socket connection. The rod 29 at its lower end portion is squared, as at 32, and extended through a square opening in said end 31 and through the slot 27. This construction prevents turning of the rod relative to the shaft. A head 34 on the lower end of the rod holds the rod within the slot 27.

The upper end of the rod is screw threaded as at 35, and operates in a screw threaded opening 36 in the hub 37 of the steering wheel. A lever 38 is fixed to the upper end of the rod and extends over the wheel so as to simulate a gas throttle or spark control lever. By turning this lever in one direction the rod is moved longitudinally and the head is caused to tighten against the end 26 so as to hold the column rigidly in upright position. By loosening the head, the column, wheel and rod can be moved into nearly horizontal position as shown in Figure 2. This is permitted by the slot 27 in which the rod is slidably mounted and by the ball and socket joint. When in this position, the steering gear can be operated from a sitting position.

I claim:

1. A coaster of the character described, comprising a body, a rear wheel mounted upon said body, a front wheel, a rotatable shaft on the body and upon which said front wheel is mounted, a steering column pivotally connected with said shaft, a steering rod fixed to said shaft and extending through said column, a steering wheel fixed to said rod, said steering rod being of angular construction at its lower end, said shaft having a slot in its upper end in which said angular portion of the steering rod is mounted.

2. A coaster of the character described, comprising a body, a rear wheel mounted upon the body, a front wheel, a rotatable shaft on the body and upon which said front wheel is mounted, a steering column, a steering rod extending through said column, said shaft having its upper end closed and provided with a slot receiving said rod, a head on the lower end of said rod engaging the closed end of said shaft, said column resting upon the upper end of said shaft, a steering wheel mounted upon said rod, and means for moving said rod longitudinally relative to the steering wheel and said column to effect the clamping of said column in any one of a plurality of upwardly inclined positions.

RICHARD W. PARKES.